(12) United States Patent
Hsiao

(10) Patent No.: US 10,625,947 B2
(45) Date of Patent: Apr. 21, 2020

(54) FENCE-ADJUSTING APPARATUS

(71) Applicant: CVC TECHNOLOGIES INC, Taichung (TW)

(72) Inventor: Yu-Ting Hsiao, Taichung (TW)

(73) Assignee: CVC TECHNOLOGIES INC, Taichung (TW)

( * ) Notice: Subject to any disclaimer, the term of this patent is extended or adjusted under 35 U.S.C. 154(b) by 0 days.

(21) Appl. No.: 16/257,004

(22) Filed: Jan. 24, 2019

(65) Prior Publication Data
US 2019/0248590 A1  Aug. 15, 2019

(30) Foreign Application Priority Data

Feb. 14, 2018 (TW) .............................. 107202457 U

(51) Int. Cl.
*B65G 21/20* (2006.01)
*B65G 21/22* (2006.01)
*B65G 39/12* (2006.01)
*B65G 39/18* (2006.01)

(52) U.S. Cl.
CPC .. *B65G 21/2072* (2013.01); *B65G 2201/0244* (2013.01)

(58) Field of Classification Search
CPC .... B65G 21/20; B65G 21/22; B65G 21/2045; B65G 21/2072; B65G 39/12; B65G 39/18
USPC .......... 198/836.1, 836.2, 836.3, 836.4, 861.1
See application file for complete search history.

(56) References Cited

U.S. PATENT DOCUMENTS

| | | | | |
|---|---|---|---|---|
| 5,322,160 A * | 6/1994 | Markiewicz | ....... | B65G 21/2072 198/836.1 |
| 5,542,789 A * | 8/1996 | Aidlin | ................ | B65G 21/2072 406/88 |
| 6,244,429 B1 * | 6/2001 | Drewitz | ............. | B65G 21/2072 198/836.3 |
| 6,305,528 B1 * | 10/2001 | Leonard | ............. | B65G 21/2072 198/836.3 |
| 6,427,829 B1 * | 8/2002 | Ledingham | ........ | B65G 21/2072 198/836.3 |
| 6,827,203 B2 * | 12/2004 | Andreoli | ............ | B65G 21/2072 198/836.3 |

(Continued)

*Primary Examiner* — Douglas A Hess
(74) *Attorney, Agent, or Firm* — Bruce Stone LLP; Joseph A. Bruce

(57) ABSTRACT

A conveyor includes two fences located on two sides of a platform. A fence-adjusting apparatus includes a primary driving unit, a secondary driving unit and a transmission. The primary driving unit includes two primary movable elements, two primary tracks and a primary driving element. Each primary movable element is connected to a corresponding one of the fences. The primary tracks movably support the primary movable elements. The primary driving element is operable to move the primary movable elements along the primary tracks. The secondary driving unit includes two secondary movable elements, two secondary tracks and a secondary driving element. Each secondary movable element is connected to a corresponding one of the fences. The secondary tracks movably support the secondary movable elements. The secondary driving element is operable to move the secondary movable elements along the secondary tracks. The transmission operatively connects the primary driving unit to the secondary driving unit.

10 Claims, 4 Drawing Sheets

(56) References Cited

U.S. PATENT DOCUMENTS

| | | | | |
|---|---|---|---|---|
| 7,530,453 B2* | 5/2009 | Ingraham | ............ | B65G 21/2072 |
| | | | | 198/817 |
| 7,607,531 B2* | 10/2009 | Bonhomme | ....... | B65G 21/2072 |
| | | | | 198/442 |
| 7,735,636 B2* | 6/2010 | Lundberg | ............ | B65G 21/2072 |
| | | | | 198/465.4 |
| 8,132,665 B2* | 3/2012 | Pawelski | ............ | B65G 21/2072 |
| | | | | 198/836.1 |
| 8,464,864 B2* | 6/2013 | Bell | .................. | B65G 21/2072 |
| | | | | 198/836.3 |
| 8,613,355 B2* | 12/2013 | Andreoli | ............ | B65G 21/2072 |
| | | | | 198/836.1 |
| 8,695,787 B2* | 4/2014 | Bell | .................. | B65G 21/2072 |
| | | | | 198/836.3 |
| 8,770,392 B2* | 7/2014 | Berger | .................. | B65G 21/16 |
| | | | | 198/836.3 |
| 8,783,447 B1* | 7/2014 | Yohe | ................. | B65G 21/2054 |
| | | | | 198/626.5 |
| 8,931,631 B2* | 1/2015 | Vasse | ................ | B65G 21/2072 |
| | | | | 198/836.1 |
| 8,955,668 B2* | 2/2015 | Cavallaro, III | .... | B65G 21/2072 |
| | | | | 198/626.5 |
| 9,073,698 B2* | 7/2015 | Huettner | ............ | B65G 21/2072 |
| 9,132,961 B2* | 9/2015 | Franzaroli | .......... | B65G 21/2045 |
| 9,481,524 B2* | 11/2016 | Bell | .................. | B65G 21/2072 |
| 9,725,246 B2* | 8/2017 | Pawelski | ............. | F15B 15/1476 |
| 9,828,186 B2* | 11/2017 | Weickert | ............ | B65G 21/2072 |

* cited by examiner

FENCE-ADJUSTING APPARATUS

BACKGROUND OF INVENTION

1. Field of Invention

The present invention relates to a conveyor and, more particularly, to a fence-adjusting apparatus for a conveyor.

2. Related Prior Art

A filling machine includes a conveyor that includes a platform, two fences and two groups of adjusters. In use, the platform supports bottles. The fences located on two sides of the platform. Each of the fences is a flexible strip connected to one a corresponding group of adjusters. The groups of adjusters are operable to move the fences relative to each other. However, each group of adjusters is operable independent of the other group of adjusters, and in each group, the adjusters are operable independent of one another. Therefore, the adjusters are operated one after another, and this takes a long period of time. Moreover, the adjusters are operated independent of one another, and this renders the gap between the fences inconsistent along their lengths. In such case, the fences cannot properly fence the bottles conveyed on the platform.

The present invention is therefore intended to obviate or at least alleviate the problems encountered in prior art.

SUMMARY OF INVENTION

It is the primary objective of the present invention to provide a conveyor with two fences on two sides of a platform and an efficient and precise fence-adjusting apparatus for moving the fences relative to each other.

To achieve the foregoing objective, the fence-adjusting apparatus includes a primary driving unit, a secondary driving unit and a transmission. The primary driving unit includes two primary movable elements, two primary tracks and a primary driving element. Each primary movable element is connected to a corresponding one of the fences. The primary tracks movably support the primary movable elements. The primary driving element is operable to move the primary movable elements along the primary tracks. The secondary driving unit includes two secondary movable elements, two secondary tracks and a secondary driving element. Each secondary movable element is connected to a corresponding one of the fences. The secondary tracks movably support the secondary movable elements. The secondary driving element is operable to move the secondary movable elements along the secondary tracks. The transmission operatively connects the primary driving unit to the secondary driving unit.

In another aspect, the primary driving element includes a knob operable to rotate the primary driving element.

In another aspect, the primary driving element includes at least one primary thread, and each of the primary movable elements includes a primary screw hole for receiving the primary thread.

In another aspect, the secondary driving element includes at least one secondary thread, and each of the secondary movable elements includes a secondary screw hole for receiving the secondary thread.

In another aspect, the primary driving element includes at least one primary pulley. The secondary driving element includes at least one secondary pulley. The transmission includes a belt extending around on the primary and secondary pulleys.

In another aspect, the fence-adjusting apparatus further includes four height adjusters and four width adjusters. Two of the height adjusters are connected to each of the primary and secondary driving units. Each of the width adjusters is connected to a corresponding one of the height adjusters at an end and connected to a corresponding one of the fences at another end.

In another aspect, each of the height adjusters includes a holder and a post. The holder is connected to a corresponding one of the primary and secondary driving units. The post is movably connected to the holder.

In another aspect, each of the height adjusters further includes a fastener operable to keep the post in position relative to the holder.

In another aspect, each of the width adjusters includes a holder and a beam. The holder is connected to a corresponding one of the posts. The beam is movably supported on the holder of a corresponding one of the height adjusters and connected to a corresponding one of the fences.

In another aspect, each of the width adjusters further includes a fastener operable to keep the beam in position relative to the holder thereof.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
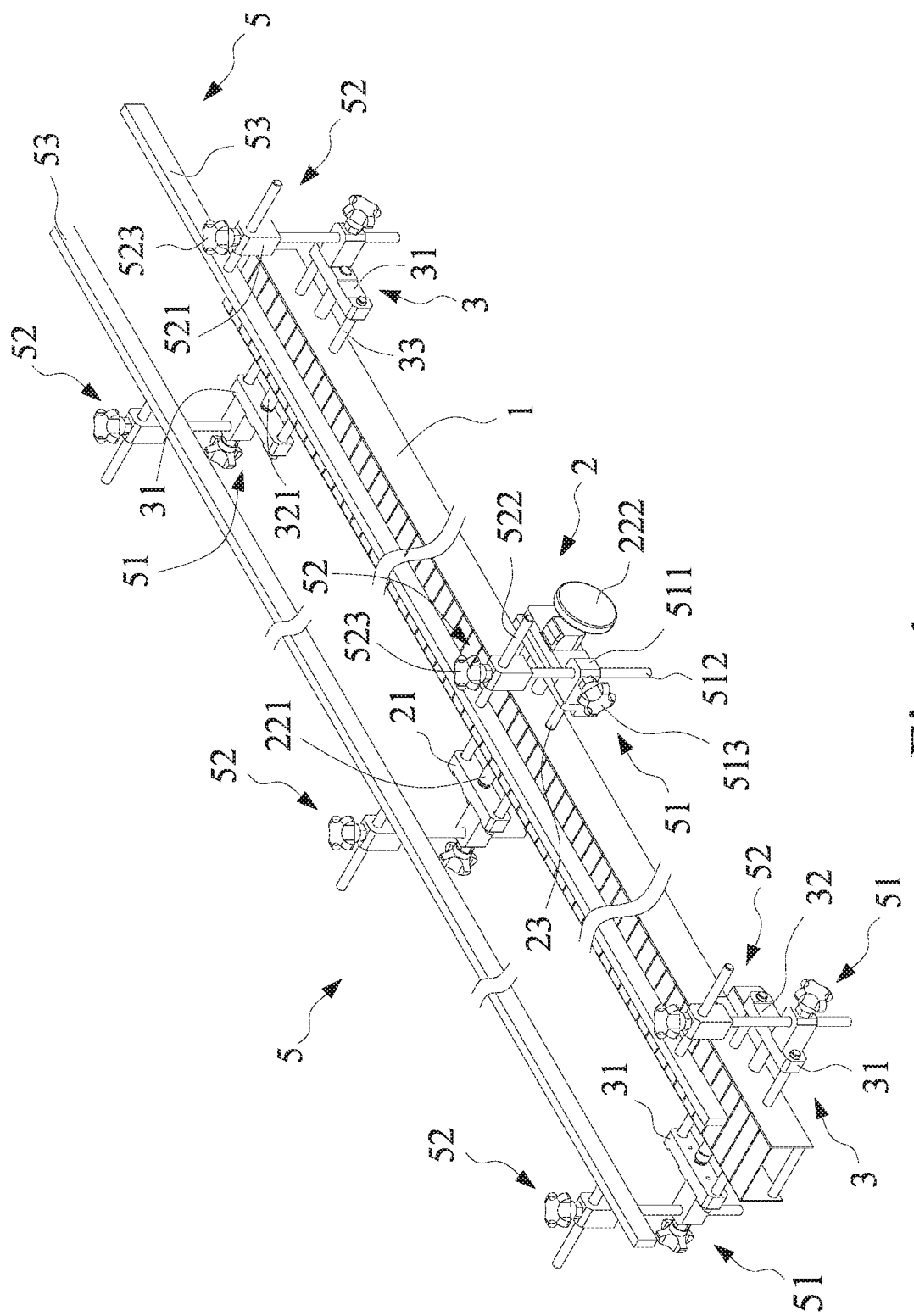
FIG. 1 is a perspective view of a portion of a conveyor equipped with a fence-adjusting apparatus according to the preferred embodiment of the present invention.
Figure 2:
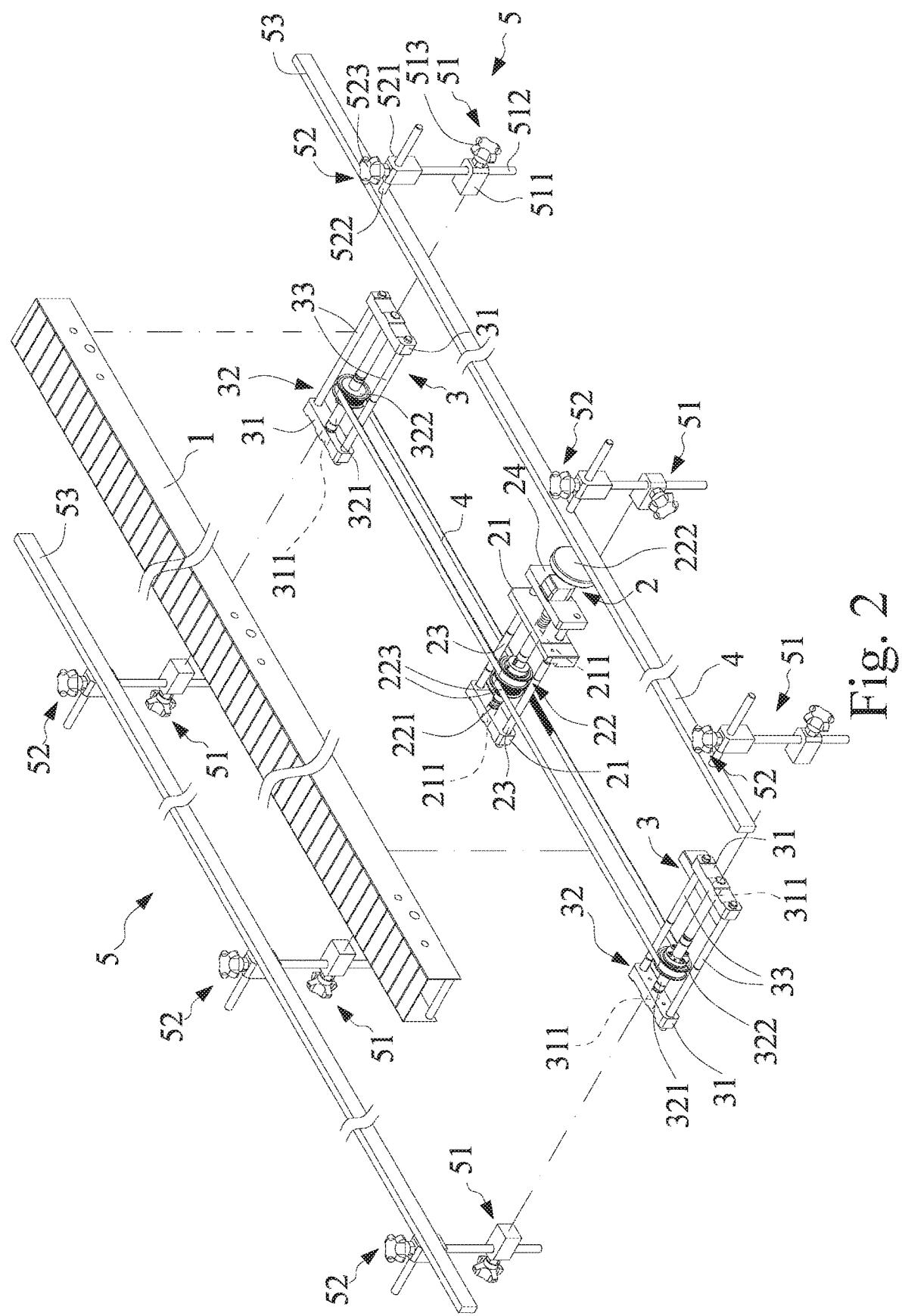
FIG. 2 is an exploded view of the conveyor shown in FIG. 1.

Referring to FIGS. 1 and 2, a conveyor includes a platform 1, two fence units 5 and a fence-adjusting apparatus according to the preferred embodiment of the present invention. In operation, the platform 1 supports bottles such as large bottles 6 shown in FIG. 3 and small bottles 6A shown in FIG. 4.

The fence units 5 are located on two sides of the platform 1. Each of the fence units 5 includes a number of height adjusters 51, an identical number of width adjusters 52 and a fence 53. There are preferably includes three height adjusters 51 and three width adjusters 52 in each of the fence units 5.

Each of the height adjusters 51 includes a holder 511, a post 512 and a fastener 513. The holder 511 is connected to the fence-adjusting apparatus to in a manner to be described. The post 512 is partially and movably inserted in a vertical tunnel (not shown) made in the holder 511. The fastener 513 includes a threaded section (not shown) inserted in a screw hole (not shown) in the holder 511, a tip (not shown) for abutment against the post 512, and a knob (not numbered) operable to rotate the fastener 513.

Each of the width adjusters 52 includes a holder 521, a beam 522 and a fastener 523. The holder 521 is connected to an upper end of the post 512. The beam 522 is partially and movably inserted in a horizontal tunnel made in the holder 521. An end of the beam 522 is connected to the fence 53. The fastener 523 includes a threaded section (not shown) inserted in a screw hole (not shown) in the holder 521, a tip (not shown) for abutment against the beam 522, and a knob (not numbered) operable to rotate the fastener 523.

The fence 53 is in the form of an elastic strip. An end of the beam 522 of each width adjuster 52 is connected to a corresponding section of the fence 53. Each width adjuster 52 is operable to move the related section of the fence 53 horizontally, and each height adjuster 51 is operable to move the corresponding section of the fence 53 vertically.

The fence-adjusting apparatus includes a primary driving unit 2, at least one secondary driving unit 3 and at least one transmission 4. Preferably, the fence-adjusting apparatus includes two secondary driving units 3 and two transmissions 4.

The driving unit 2 includes two primary movable elements 21, a primary driving element 22, two primary tracks 23 and a stationary element 24. The stationary element 24 is non-movably connected to a proper portion of the conveyor. Each of the primary tracks 23 is in the form of a rod with an end connected to the stationary element 24.

The primary driving element 22 is in the form of a rod formed with two primary threads 221, a knob 222 and at least one primary pulley 223. A smooth section of the primary driving element 22 is rotationally inserted in the stationary element 24. The primary threads 221 extend in two opposite directions. The knob 222 is connected to an end of the primary driving element 22. The primary driving element 22 preferably includes two primary pulleys 223.

Each primary movable element 21 includes a primary screw hole 211 and two primary apertures (not numbered) on two opposite sides of the primary screw hole 211. The primary screw hole 211 receives a corresponding primary thread 221. The primary apertures receive the primary tracks 23. Each primary movable element 21 is connected to the holder 511 of a corresponding height adjuster 51.

The primary movable elements 21 are located on two opposite sides of the platform 1. The primary driving element 22 and the primary tracks 23 extend throughout the platform 1.

Each of the secondary driving units 3 includes two secondary movable elements 31, a primary driving element 32 and two tracks 33. Each of the tracks 33 is in the form of a rod supported on the conveyor.

The secondary driving element 32 is in the form of a rod formed with two secondary threads 321 and a secondary pulley 322. A smooth section of the primary driving element 22 is rotationally supported on the conveyor. The secondary threads 321 extend in two opposite directions. The secondary pulley 322 is provided on a proper section of the secondary driving element 32.

Each secondary movable element 31 includes a secondary screw hole 311 and two secondary apertures (not numbered) on two opposite sides of the secondary screw hole 311. The secondary screw hole 311 receives a corresponding secondary thread 321. The secondary apertures receive the secondary primary tracks 23. Each secondary movable element 31 is connected to the holder 511 of a corresponding height adjuster 51.

The secondary movable elements 31 are located on two opposite sides of the platform 1. The secondary driving element 32 and the secondary tracks 33 extend throughout the platform 1.

Each transmission 4 is a belt in the form of a loop. Each transmission 4 extends around a corresponding primary pulley 223 and a corresponding secondary pulley 322. Thus, the knob 222 is operable to rotate the primary driving element 22, thereby rotating the secondary driving elements 32 via the transmissions 4. The primary driving element 22 moves the primary movable elements 21 relative to each other on the primary tracks 23, and each secondary driving element 32 moves the corresponding secondary movable elements 31 relative to each other on the corresponding primary tracks 33. Synchronously, the primary movable elements 21 and the secondary movable elements 31 move the height adjusters 51 and the width adjusters 52, and the width adjusters 52 move the fences 53 relative to each other. Advantageously, the gap between the fences 53 is consistent throughout their lengths.

Figure 3:
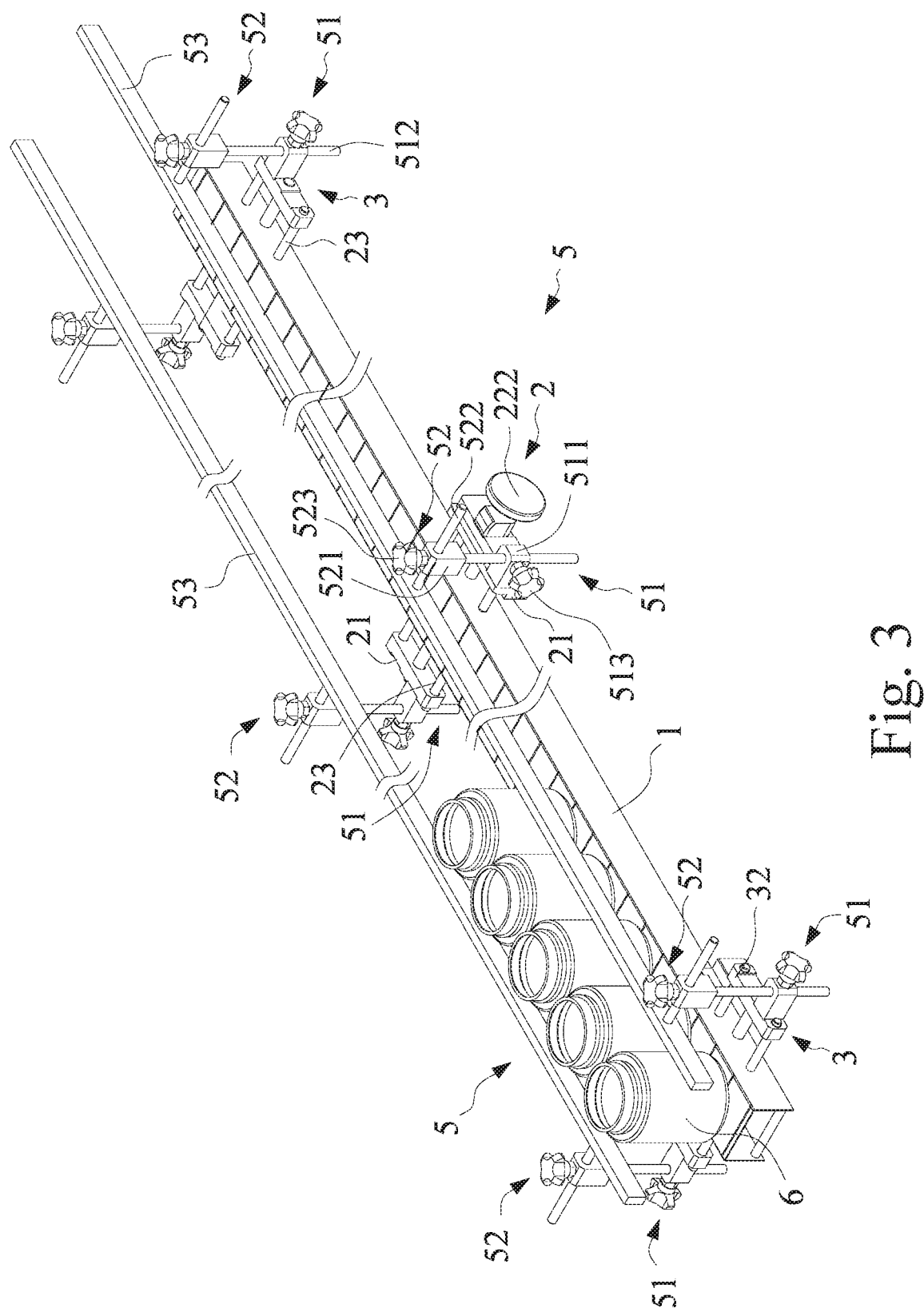
FIG. 3 is a perspective view of large bottles conveyed by the conveyor shown in FIG. 1.

Referring to FIG. 3, the large bottles 6 are conveyed on the platform 1. The knob 222 is operable to move the fences 53 away from each other, thereby increasing the gap between the fences 53 in compliance with the width of the large bottles 6.

Figure 4:
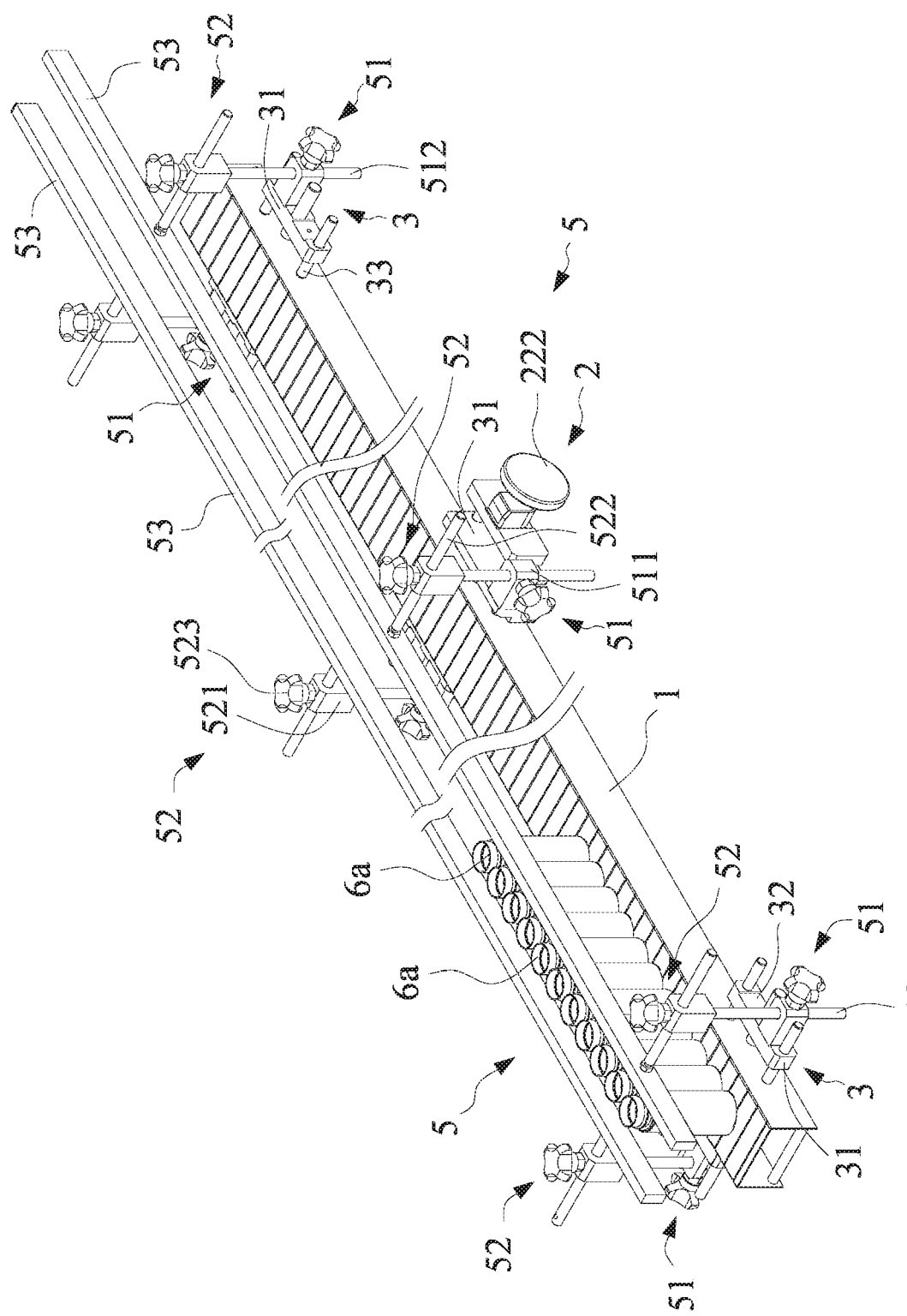
FIG. 4 is a perspective view of small bottles conveyed by the conveyor shown in FIG. 1.

Referring to FIG. 4, the small bottles 6a are conveyed on the platform 1. The knob 222 is operable to move the fences 53 toward each other, thereby reducing the gap between the fences 53 in compliance with the width of the small bottles 6a.

Advantageously, the knob 222 is operable to synchronously move the fences 53. Therefore, the adjustment of the gap between the fences 53 is efficient. Moreover, all sections of the fences 53 are always moved for a same distance so that the gap between the fences 53 is always constant. Hence, the adjustment of the gap between the fences 53 is precise.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A fence-adjusting apparatus for a conveyor comprising a platform and two fences on two opposite sides of the platform, the fence-adjusting comprising:
  a primary driving unit comprising:
    two primary movable elements each of which is connected to a corresponding one of the fences;
    two primary tracks for movably supporting the primary movable elements; and
    a primary driving element operable to move the primary movable elements along the primary tracks;
  at least one secondary driving unit comprising:
    two secondary movable elements each of which is connected to a corresponding one of the fences;
    two secondary tracks for movably supporting the secondary movable elements; and
    a secondary driving element operable to move the secondary movable elements along the secondary tracks; and
  at least one transmission for operatively connecting the primary driving unit to the secondary driving unit.

2. The fence-adjusting apparatus according to claim 1, wherein the primary driving element comprises a knob operable to rotate the primary driving element.

3. The fence-adjusting apparatus according to claim 1, wherein the primary driving element comprises at least one primary thread, wherein each of the primary movable elements comprises a primary screw hole for receiving the primary thread.

4. The fence-adjusting apparatus according to claim 1, wherein the secondary driving element comprises at least one secondary thread, wherein each of the secondary movable elements comprises a secondary screw hole for receiving the secondary thread.

5. The fence-adjusting apparatus according to claim 1, wherein the primary driving element comprises at least one primary pulley, wherein the secondary driving element comprises at least one secondary pulley, wherein the transmission comprises a belt extending around on the primary and secondary pulleys.

6. The fence-adjusting apparatus according to claim 1, further comprising:

two height adjusters connected to the primary driving unit;

two height adjusters attached to the secondary driving unit; and four width adjusters each of which is connected to a corresponding one of the height adjusters at an end and connected to a corresponding one of the fences at another end.

7. The fence-adjusting apparatus according to claim 6, wherein each of the height adjusters comprises:

a holder connected to a corresponding one of the primary and secondary driving units; and a post movably connected to the holder.

8. The fence-adjusting apparatus according to claim 7, wherein each of the height adjusters further comprises a fastener operable to keep the post in position relative to the holder.

9. The fence-adjusting apparatus according to claim 7, wherein each of the width adjusters comprises:

a holder connected to a corresponding one of the posts; and a beam movably supported on the holder of a corresponding one of the height adjusters and connected to a corresponding one of the fences.

10. The fence-adjusting apparatus according to claim 9, wherein each of the width adjusters further comprises a fastener operable to keep the beam in position relative to the holder thereof.

\* \* \* \* \*